United States Patent
Suhadolnik et al.

(10) Patent No.: US 7,173,071 B2
(45) Date of Patent: Feb. 6, 2007

(54) PHOTO-CURED AND STABILIZED COATINGS

(75) Inventors: Joseph Suhadolnik, Yorktown Heights, NY (US); Mervin Wood, Mobile, AL (US); Ramanathan Ravichandran, Suffern, NY (US); Walter Renz, Brookfield, CT (US); Andrea Roberts, Wingdale, NY (US); Nancy Cliff, Ringwood, NJ (US); Eugene Sitzman, Hartsdale, NY (US); David Bramer, Putnam Valley, NY (US)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 256 days.

(21) Appl. No.: 10/838,473

(22) Filed: May 4, 2004

(65) Prior Publication Data

US 2004/0235975 A1    Nov. 25, 2004

Related U.S. Application Data

(60) Provisional application No. 60/468,184, filed on May 6, 2003.

(51) Int. Cl.
| | | |
|---|---|---|
| *C08J 3/28* | (2006.01) | |
| *C08K 5/3475* | (2006.01) | |
| *C08F 2/50* | (2006.01) | |
| *C09D 4/02* | (2006.01) | |
| *C09D 175/16* | (2006.01) | |

(52) U.S. Cl. .............................. 522/18; 522/75; 522/96; 427/519

(58) Field of Classification Search ................. 522/34, 522/42, 75, 167, 18; 427/519
See application file for complete search history.

(56) References Cited

U.S. PATENT DOCUMENTS

| | | | | |
|---|---|---|---|---|
| 5,712,324 A | * | 1/1998 | Lilly ........................... | 522/75 |
| 5,942,290 A | | 8/1999 | Leppard et al. ............. | 427/510 |
| 5,977,219 A | | 11/1999 | Ravichandran et al. ....... | 524/91 |
| 6,187,845 B1 | | 2/2001 | Renz et al. .................... | 524/91 |
| 6,191,199 B1 | | 2/2001 | Renz et al. .................. | 524/100 |
| 2001/0025086 A1 | | 9/2001 | LeBoeuf et al. .......... | 525/329.7 |
| 2003/0139499 A1 | | 7/2003 | Suhadolnik et al. ........... | 524/91 |

FOREIGN PATENT DOCUMENTS

| | | |
|---|---|---|
| CA | 2037769 | 9/1991 |
| EP | 1 106627 A1 * | 6/2001 |
| WO | 03/046017 | 6/2003 |

* cited by examiner

*Primary Examiner*—Susan Berman
(74) *Attorney, Agent, or Firm*—Tyler A. Stevenson

(57) ABSTRACT

Photo-curable coating formulations which comprise a durable and/or red-shifted reactable hydroxyphenylbenzotriazole ultraviolet light absorber (UVA) are effectively photocured employing a combination of α-hydroxy ketone and bisacylphosphine oxide photoinitiators. The reactable UVA's are reacted into the coating upon curing. The combination of the photoinitiators bis(2,4,6-trimethylbenzoyl) phenylphosphine oxide and 1-hydroxycyclohexylphenylketone is especially effective for this purpose.

22 Claims, No Drawings

PHOTO-CURED AND STABILIZED COATINGS

This application claims the benefit under 35 USC 119(e) of U.S. provisional application No. 60/468,184, filed May 6, 2003.

The present invention is aimed at a process for photo-curing coating formulations which comprise durable and/or red-shifted reactable hydroxyphenylbenzotriazole ultraviolet light absorbers.

Durable and/or red-shifted hydroxyphenylbenzotriazoles are disclosed for example in U.S. Pat. No. 5,977,219. Solar control films comprising durable and/or red-shifted hydroxyphenylbenzotriazoles are disclosed in U.S. Pat. Nos. 6,187,845 and 6,191,199.

Copending U.S. application Ser. No. 10/302,110, filed Nov. 22, 2002 is aimed at a process for photo-curing coating formulations which comprise durable and/or red-shifted hydroxyphenylbenzotriazole ultraviolet light absorbers.

Surprisingly, photo-curable coating formulations that comprise durable and/or red-shifted reactable hydroxyphenylbenzotriazole UV absorbers are effectively photo-cured by employing a combination of α-hydroxy ketone and bisacylphosphine oxide photoinitiators. This is surprising since UV absorbers block light that is required for light curing. This is especially surprising for highly effective UV absorbers such as the present hydroxyphenylbenzotriazoles since they absorb more UV light by virtue of being red-shifted.

An object of this invention is to provide for protective thin photo-cured coatings which comprise high performance durable and/or red-shifted hydroxyphenylbenzotriazole ultraviolet light absorbers (UVA's) that are reacted into the coating.

DETAILED DISCLOSURE

Disclosed is a process for forming a protective film coating which process comprises curing a coating composition by irradiating said composition with ultraviolet radiation or daylight or with light sources equivalent to daylight, wherein said coating composition comprises a) at least one ethylenically unsaturated polymerizable compound, b) at least one durable and/or red-shifted reactable hydroxyphenylbenzotriazole UV absorber comprising an ethylenically unsaturated polymerizable group and c) a combination of photoinitiators comprising i) at least one α-hydroxy ketone photoinitiator and ii) at least one bisacylphosphine oxide photoinitiator.

The durable and/or red-shifted reactable hydroxyphenylbenzotriazoles of the present invention are generically described in U.S. Pat. Nos. 5,977,219, 6,166,218, 6,262,151 and 6,458,872, filed May 08, 2001, and U.S. application Ser. No. 09/772,245, filed Jan. 29, 2001, the relevant disclosures of which are hereby incorporated by reference.

The hydroxyphenylbenzotriazoles are for instance of formula

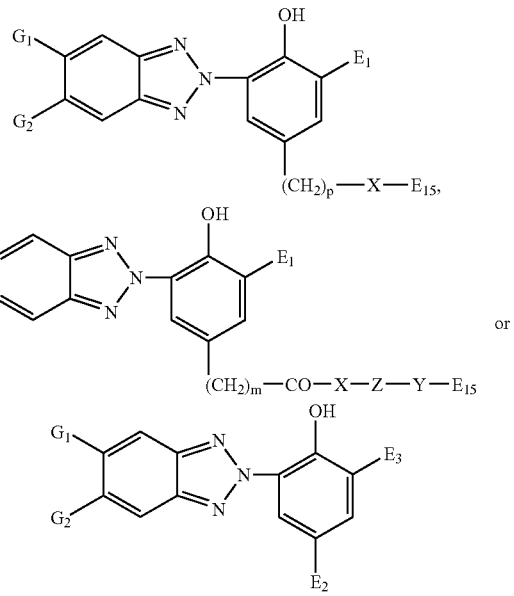

wherein $G_1$ is hydrogen or halogen, $G_2$ is halogen, nitro, cyano, perfluoroalkyl of 1 to 12 carbon atoms, —$COOG_3$, —$P(O)(C_6H_5)_2$, —$CO$-$G_3$, —$CO$—$NH$-$G_3$, —$CO$—$N(G_3)_2$, —$N(G_3)$-$CO$-$G_3$, $E_5SO$— or $E_5SO_2$—;

$G_3$ is hydrogen, straight or branched chain alkyl of 1 to 24 carbon atoms, straight or branched chain alkenyl of 2 to 18 carbon atoms, cycloalkyl of 5 to 12 carbon atoms, phenylalkyl of 7 to 15 carbon atoms, phenyl, or said phenyl or said phenylalkyl substituted on the phenyl ring by 1 to 4 alkyl of 1 to 4 carbon atoms, $E_1$ is hydrogen, straight or branched chain alkyl of 1 to 24 carbon atoms, straight or branched chain alkenyl of 2 to 24 carbon atoms, cycloalkyl of 5 to 12 carbon atoms, phenylalkyl of 7 to 15 carbon atoms, phenyl, or said phenyl or said phenylalkyl substituted on the phenyl ring by 1 to 4 alkyl of 1 to 4 carbon atoms; or $E_1$ is alkyl of 1 to 24 carbon atoms substituted by one or two hydroxy groups, when $E_1$ is phenylalkyl of 7 to 15 carbon atoms or phenyl, or said phenyl or said phenylalkyl substituted on the phenyl ring by 1 to 4 alkyl of 1 to 4 carbon atoms, $G_2$ may also be hydrogen, $E_2$ is straight or branched alkyl chain of 1 to 24 carbon atoms, straight or branched chain alkenyl of 2 to 18 carbon atoms, cycloalkyl of 5 to 12 carbon atoms, phenylalkyl of 7 to 15 carbon atoms, phenyl, or said phenyl or said phenylalkyl substituted on the phenyl ring by one to three alkyl of 1 to 4 carbon atoms; or $E_2$ is said alkyl of 1 to 24 carbon atoms or said alkenyl of 2 to 18 carbon atoms substituted by one or more —OH, —$OCOE_6$, —$OE_4$, —NCO, —$NH_2$, —$NHCOE_6$, —$NHE_4$ or —$N(E_4)_2$, or mixtures thereof, where $E_4$ is straight or branched chain alkyl of 1 to 24 carbon atoms; or said alkyl or said alkenyl interrupted by one or more —O—, —NH— or —$NE_4$— groups or mixtures thereof and which can be unsubstituted or substituted by one or more —OH, —$OE_4$ or —$NH_2$ groups or mixtures thereof, $E_3$ is straight or branched chain alkenyl of 2 to 24 carbon atoms, $E_5$ is alkyl of 1 to 20 carbon atoms, hydroxyalkyl of 2 to 20 carbon atoms, alkyl substituted by alkoxycarbonyl of 2 to 9 carbon atoms, alkenyl of 3 to 18 carbon atoms, cycloalkyl of 5 to 12 carbon atoms, phenylalkyl of 7 to 15 carbon atoms, aryl of 6 to 10 carbon atoms or said aryl substituted by one or two alkyl of 1 to 4 carbon atoms or 1,1,2,2-tetrahydroperfluoroalkyl where the perfluoroalkyl moiety is of 6 to 16 carbon atoms, X is —O— or —N($E_{16}$)—, Y is —O— or —N($E_{17}$)—, Z is $C_2$–$C_{12}$-alkylene, $C_4$–$C_{12}$-alkylene interrupted by one to three nitrogen atoms, oxygen atoms or a mixture thereof, or is $C_3$–$C_{12}$-alkylene, butenylene, butynylene, cyclohexylene or phenylene, each substituted by a hydroxyl group, m is zero, 1 or 2, p is 1 to 24, $E_6$ is hydrogen, straight or branched chain $C_1$–$C_{18}$alkyl, $C_5$–$C_{12}$cycloalkyl, straight or branched chain $C_2$–$C_{18}$alkenyl, $C_6$–$C_{14}$aryl or $C_7$–$C_{15}$aralkyl, $E_{15}$ is a group —CO—C($E_{18}$)=C(H)$E_{19}$ or, when Y is —N($E_{17}$)-, forms together with $E_{17}$ a group —CO—CH=CH—CO—, wherein $E_{18}$ is hydrogen or methyl, and $E_{19}$ is hydrogen, methyl or —CO—Y-$E_{20}$, wherein $E_{20}$ is hydrogen, $C_1$–$C_{12}$-alkyl or a group of the formula

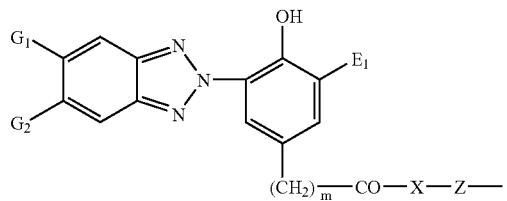

where $E_1$, $G_1$, $G_2$, X, Z and m are as previously defined, and $E_{16}$ and $E_{17}$ independently of one another are hydrogen, $C_1$–$C_{12}$-alkyl, $C_3$–$C_{12}$-alkyl interrupted by 1 to 3 oxygen atoms, or is cyclohexyl or $C_7$–$C_{15}$aralkyl, and $E_{16}$ together with $E_{17}$ in the case where Z is ethylene, also forms ethylene.

For instance, in the present hydroxyphenylbenzotriazoles $G_1$ is hydrogen, $G_2$ is hydrogen, cyano, chloro, fluoro, —CF$_3$, —CO-$G_3$, $E_5$SO— or $E_5$SO$_2$—, $G_3$ is straight or branched chain alkyl of 1 to 24 carbon atoms, straight or branched chain alkenyl of 2 to 18 carbon atoms, cycloalkyl of 5 to 12 carbon atoms, phenylalkyl of 7 to 15 carbon atoms, phenyl, or said phenyl or said phenylalkyl substituted on the phenyl ring by 1 to 4 alkyl of 1 to 4 carbon atoms, $E_1$ is phenylalkyl of 7 to 15 carbon atoms, phenyl, or said phenyl or said phenylalkyl substituted on the phenyl ring by 1 to 4 alkyl of 1 to 4 carbon atoms, $E_3$ is allyl, and $E_5$ is alkyl of 1 to 20 carbon atoms, hydroxyalkyl of 2 to 20 carbon atoms, alkenyl of 3 to 18 carbon atoms, cycloalkyl of 5 to 12 carbon atoms, phenylalkyl of 7 to 15 carbon atoms, aryl of 6 to 10 carbon atoms or said aryl substituted by one or two alkyl of 1 to 4 carbon atoms or 1,1,2,2-tetrahydroperfluoroalkyl where the perfluoroalkyl moiety is of 6 to 16 carbon atoms;

or where $G_1$ is hydrogen, $G_2$ is chloro, fluoro, —CF$_3$, $E_5$SO— or $E_5$SO$_2$—, $E_1$ is hydrogen or straight or branched alkyl of 1 to 24 carbon atoms, $E_3$ is allyl, and $E_5$ is straight or branched chain alkyl of 1 to 7 carbon atoms.

Another embodiment is where in the hydroxyphenylbenzotriazole UVA's $G_1$ is hydrogen, $G_2$ is —CF$_3$ or fluoro, $E_1$ is hydrogen, straight or branched alkyl of 1 to 24 carbon atoms or phenylalkyl of 7 to 15 carbon atoms, $E_2$ is straight or branched alkyl chain of 1 to 24 carbon atoms, straight or branched chain alkenyl of 2 to 18 carbon atoms, cycloalkyl of 5 to 12 carbon atoms, phenylalkyl of 7 to 15 carbon atoms, phenyl, or said phenyl or said phenylalkyl substituted on the phenyl ring by 1 to 3 alkyl of 1 to 4 carbon atoms;

when $E_1$ is phenylalkyl of 7 to 15 carbon atoms, $G_2$ may also be hydrogen, $E_3$ is allyl, and $E_{15}$ is a group —CO—C($E_{18}$)=C(H)$E_{19}$ or, when Y is —N($E_{17}$)-, forms together with $E_{17}$ a group —CO—CH=CH—CO—, wherein $E_{18}$ is hydrogen or methyl, and $E_{19}$ is hydrogen or methyl.

In another embodiment, in the present hydroxyphenylbenzotriazole UVA's $G_1$ is hydrogen, $G_2$ is —CF$_3$, $E_1$ is phenylalkyl of 7 to 15 carbon atoms, phenyl, or said phenyl or said phenylalkyl substituted on the phenyl ring by 1 to 4 alkyl of 1 to 4 carbon atoms, $E_2$ is straight or branched alkyl chain of 1 to 24 carbon atoms, straight or branched chain alkenyl of 2 to 18 carbon atoms, cycloalkyl of 5 to 12 carbon atoms, phenylalkyl of 7 to 15 carbon atoms, phenyl, or said phenyl or said phenylalkyl substituted on the phenyl ring by 1 to 3 alkyl of 1 to 4 carbon atoms; or $E_2$ is said alkyl of 1 to 24 carbon atoms or said alkenyl of 2 to 18 carbon atoms substituted by one or more —OH, —OCO$E_{11}$, —NH$_2$ or —NHCO$E_{11}$, or mixtures thereof, or said alkyl or said alkenyl interrupted by one or more —O— and which can be unsubstituted or substituted by one or more —OH, and $E_3$ is allyl.

In another embodiment, in the present hydroxyphenylbenzotriazole UVA's $G_1$ is hydrogen, $G_2$ is —CF$_3$, $E_1$ is hydrogen, straight or branched alkyl of 4 to 24 carbon atoms or phenylalkyl of 7 to 15 carbon atoms, and $E_3$ is allyl.

For example, the hydroxyphenylbenzotriazole UVA's are of the formula

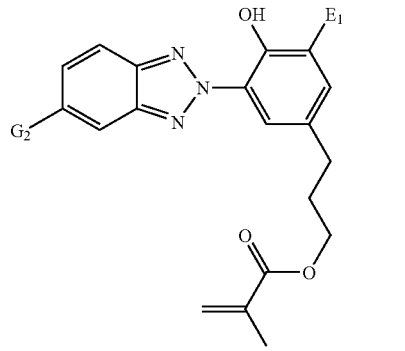

or

-continued

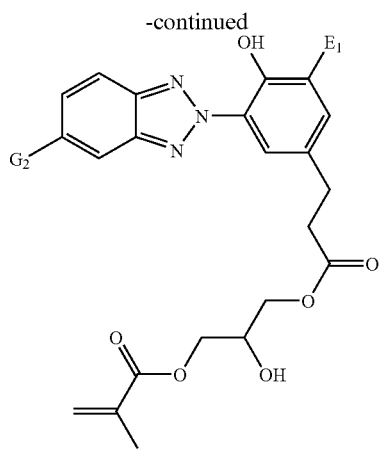

where $E_1$ is t-butyl or α-cumyl and $G_2$ is phenylsulfone or —$CF_3$.

The present hydroxyphenylbenzotriazoles are employed from about 0.5% to about 5% by weight, based on the weight of the coating composition. For example, the present hydroxyphenylbenzotriazoles are employed from about 0.5% to about 4%, from about 0.5% to about 3%, from about 0.5% to about 2%, or from about 0.5% to about 1% by weight, based on the weight of the coating composition. For instance, the present hydroxyphenylbenzotriazoles are employed from about 1% to about 5%, from about 2% to about 5%, from about 3% to about 5%, or from about 4% to about 5% by weight, based on the weight of the coating composition. For instance, the present hydroxyphenylbenzotriazoles are employed from about 1% to about 4.5% or from about 2% to about 4% by weight, based on the weight of the coating formulation.

The α-hydroxy ketone and bisacylphosphine oxide photoinitiators of this invention are known and are disclosed for example in U.S. Pat. Nos. 5,942,290, 5,534,559 and 6,020,528, the relevant disclosures of which are hereby incorporated by reference.

The α-hydroxy ketone photoinitiators are of the formula

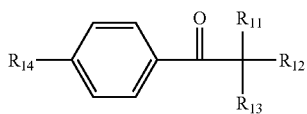

where $R_{11}$ and $R_{12}$ independently of one another are hydrogen, $C_1$–$C_6$ alkyl, phenyl, $C_1$–$C_6$ alkoxy, $OSiR_{16}(R_{17})_2$ or —$O(CH_2CH_2O)_q$—$C_1$–$C_6$ alkyl, or $R_{11}$ and $R_{12}$, together with the carbon atom to which they are attached, form a cyclohexyl ring;

q is a number from 1 to 20;

$R_{13}$ is OH, $C_1$–$C_{16}$ alkoxy or —$O(CH_2CH_2O)_q$—$C_1$–$C_6$ alkyl;

$R_{14}$ is hydrogen, $C_1$–$C_{18}$ alkyl, $C_1$–$C_{18}$ alkoxy, —$OCH_2CH_2$—$OR_{15}$, a group $CH_2$=$C(CH_3)$— or is

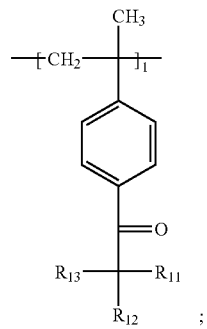

l is a number from 2 to 10;

$R_{15}$ is hydrogen, —COCH=$CH_2$ or —COC($CH_2$)=$CH_2$; and $R_{16}$ and $R_{17}$ independently of one another are $C_1$–$C_8$ alkyl or phenyl.

α-Hydroxy ketone photoinitiators that are of interest are those in which $R_{11}$ and $R_{12}$ independently of one of those are hydrogen, $C_1$–$C_6$ alkyl or phenyl or $R_{11}$ and $R_{12}$, together with the carbon atom to which they are attached, form a cyclohexyl ring; $R_{13}$ is OH; and $R_{14}$ is hydrogen, $C_1$–$C_{12}$ alkyl, $C_1$–$C_{12}$ alkoxy, —$OCH_2CH_2OR_{15}$, —$C(CH_3)$=$CH_2$ or is

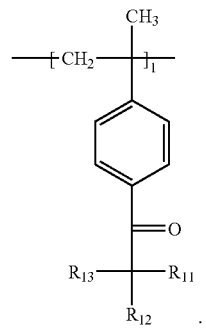

For example, suitable as the α-hydroxy ketone photoinitiators are those in which $R_{11}$ and $R_{12}$ independently of one another are methyl or ethyl or $R_{11}$ and $R_{12}$, together with the carbon atom to which they are attached, form a cyclohexyl ring; $R_{13}$ is hydrogen and $R_{14}$ is hydrogen, $C_1$–$C_4$ alkyl, $C_1$–$C_4$ alkoxy or —$OCH_2CH_2OH$.

For instance, suitable α-hydroxy ketone photoinitiators are

α-hydroxycyclohexyl phenyl ketone, 2-hydroxy-2-methyl-1-phenylpropanone, 2-hydroxy-2-methyl-1-(4-isopropylphenyl)propanone, 2-hydroxy-2-methyl-1-(4-dodecylphenyl)propanone and 2-hydroxy-2-methyl-1-[(2-hydroxyethoxy)phenyl]propanone.

The present α-hydroxy ketone photoinitiator is for example α-hydroxycyclohexylphenyl ketone, available from Ciba Specialty Chemicals as Irgacure® 184.

The bisacylphosphine oxide photoinitiators are of the formula

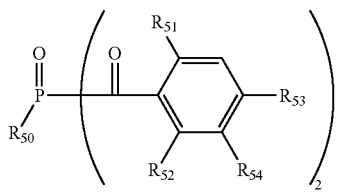

wherein $R_{50}$ is $C_1$–$C_{12}$ alkyl, cyclohexyl or phenyl which is unsubstituted or is substituted by 1 to 4 halogen or $C_1$–$C_8$ alkyl, $R_{51}$ and $R_{52}$ are each independently of the other $C_1$–$C_8$ alkyl or $C_1$–$C_8$alkoxy, $R_{53}$ is hydrogen or $C_1$–$C_8$ alkyl, and $R_{54}$ is hydrogen or methyl.

For example, $R_{50}$ is $C_2$–$C_{10}$ alkyl, cyclohexyl or phenyl which is unsubstituted or is substituted by 1 to 4 $C_1$–$C_4$ alkyl, Cl or Br.

Another embodiment is where $R_{50}$ is $C_3$–$C_8$ alkyl, cyclohexyl or phenyl which is unsubstituted or is substituted in the 2-, 3-, 4- or 2,5-positions by $C_1$–$C_4$ alkyl.

For instance, $R_{50}$ is $C_4$–$C_{12}$ alkyl or cyclohexyl, $R_{51}$ and $R_{52}$ are each independently of the other $C_1$–$C_8$ alkyl or $C_1$–$C_8$alkoxy and $R_{53}$ is hydrogen or $C_1$–$C_8$ alkyl.

For instance, $R_{51}$ and $R_{52}$ are $C_1$–$C_4$ alkyl or $C_1$–$C_4$alkoxy and $R_{53}$ is hydrogen or $C_1$–$C_4$ alkyl.

Another emodiment is where $R_5$, and $R_{52}$ are methyl or methoxy and $R_{53}$ is hydrogen or methyl.

For example $R_{51}$, $R_{52}$ and $R_{53}$ are methyl.

Another embodiment is where $R_{51}$, $R_{52}$ and $R_{53}$ are methyl and $R_{54}$ is hydrogen.

Another embodiment is where $R_{50}$ is $C_3$–$C_8$ alkyl.

For example, $R_{51}$ and $R_{52}$ are methoxy, $R_{53}$ and $R_{54}$ are hydrogen and $R_{50}$ is isooctyl.

For instance $R_{50}$ is isobutyl.

For example $R_{50}$ is phenyl.

The present bisacylphosphine oxide photoinitiator is for example Irgacure® 819, bis(2,4,6-trimethylbenzoyl)-phenylphosphine oxide, available from Ciba Specialty Chemicals, or is bis(2,6-dimethoxybenzoyl)-isooctylphosphine oxide.

Straight or branched chain alkyl is for example, methyl, ethyl, propyl, isopropyl, butyl, isobutyl, sec-butyl, tert-butyl, pentyl, isopentyl, isooctyl, hexyl, heptyl, octyl, nonyl, decyl or dodecyl.

The α-hydroxy ketone photoinitiators are present in the coating compositions of this invention from about 1% to about 7% by weight, based on the weight of the coating composition. For instance, the α-hydroxy ketone photoinitiators are present from about 1% to about 2%, from about 1% to about 3% from about 1% to about 4%, from about 1% to about 5%, or from about 1% to about 6% by weight, based on the weight of the coating formulation. For example, the α-hydoxy ketone photoinitiators are present from about 2% to about 7%, from about 3% to about 7%, from about 4% to about 7%, from about 5% to about 7%, or from about 6% to about 7% by weight, based on the weight of the coating composition. For example, the α-hydroxy ketone photoinitiators are present from about 2% to about 6% by weight, or from about 3% to about 5% by weight, based on the weight of the coating composition.

The present bisacylphosphine oxide photoinitiators are employed from about 0.1% to about 2% by weight, based on the weight of the coating composition. For instance, the present bisacylphosphine oxide photoinitiators are employed from about 0.1% to about 1.5%, from about 0.1% to about 1%, or from about 0.1% to about 0.5% by weight, based on the weight of the coating formulation. For example, the present bisacylphosphine oxide photoinitiators are employed from about 0.2% to 2%, from about 0.5% to about 2%, or from about 0.7% to about 2% by weight, based on the weight of the coating composition. For example, the present bisacylphosphine oxide photoinitators are employed from about 0.2% to about 1.5%, or from about 0.5 to about 1% by weight, based on the weight of the coating composition.

The α-hydroxy ketone photoinitiator is for example used in excess of the bisacylphosphine oxide photoinitiator.

The weight ratio of α-hydroxy ketone to bisacylphosphine oxide is for example from about 5:1 to about 15:1. For example, the weight ratio of α-hydroxy ketone to bisacylphosphine oxide is from about 5:1 to about 12:1, from about 5:1 to about 10:1, from about 5:1 to about 9:1, from about 5:1 to about 8:1 or from about 5:1 to about 7:1. For instance, the weight ratio of α-hydroxy ketone to bisacylphosphine oxide is from about 7:1 to about 15:1, from about 8:1 to about 15:1, from about 9:1 to about 15:1, from about 10:1 to about 15:1, or from about 12:1 to about 15:1. For example, the weight ratio of α-hydroxy ketone to bisacylphosphine oxide is from about 7:1 to about 12:1, or from about 8:1 to about 11:1.

Efficient curing of the present coatings is possible with α-hydroxy ketone photoinitiators alone.

The ethylenically unsaturated polymerizable compounds can contain one or more than one olefinic double bond. They may be low molecular (monomeric) or high molecular (oligomeric) compounds.

Typical examples of monomers containing one double bond are alkyl or hydroxyalkyl acrylates or methacrylates, for example methyl, ethyl, butyl, 2-ethylhexyl and 2-hydroxyethyl acrylate, isobornyl acrylate, and methyl and ethyl methacrylate. Further examples of these monomers are acrylonitrile, acrylamide, methacrylamide, N-substituted (meth)acrylamides, vinyl esters such as vinyl acetate, vinyl ethers such as isobutyl vinyl ether, styrene, alkylstyrenes, halostyrenes, N-vinylpyrrolidone, vinyl chloride and vinylidene chloride.

Examples of monomers containing more than one double bond are ethylene glycol diacrylate, propylene glycol diacrylate, neopentyl glycol diacrylate, hexamethylene glycol diacrylate, bisphenol A diacrylate, 4,4'-bis(2-acryloyloxyethoxy)diphenylpropane, trimethylolpropane triacrylate, pentaerythritol triacrylate and tetraacrylate, pentaerythritol divinyl ether, vinyl acrylate, divinyl benzene, divinyl succinate, diallyl phthalate, triallyl phosphate, triallyl isocyanurate or tris(2-acryloylethyl)isocyanurate. Examples of high molecular weight (oligomeric) polyunsaturated compounds are acrylated epoxy resins, acrylated polyethers, acrylated polyurethanes and acrylated polyesters. Further examples of unsaturated oligomers are unsaturated polyester resins, which are usually prepared from maleic acid, phthalic acid and one or more diols and which have molecular weights of greater than about 500. Unsaturated oligomers of this type are also known as prepolymers.

Typical examples of unsaturated compounds are esters of ethylenically unsaturated carboxylic acids and polyols or polyepoxides, and polymers containing ethylenically unsaturated groups in the chain or in side groups, including unsaturated polyesters, polyamides and polyurethanes and copolymers thereof, polybutadiene and butadiene copolymers, polyisoprene and isoprene copolymers, polymers and copolymers containing (meth)acrylic groups in side-chains, as well as mixtures of one or more than one such polymer.

Illustrative examples of unsaturated carboxylic acids are acrylic acid, methacrylic acid, crotonic acid, itaconic acid, cinnamic acid, unsaturated fatty acids such as linolenic acid or oleic acid.

Suitable polyols are aromatic, aliphatic and cycloaliphatic polyols. Aromatic polyols are typically hydroquinone, 4,4'-dihydroxydiphenyl, 2,2-bis(4-hydroxyphenyl)propane, as well as novolacs and cresols. Polyepoxides include those based on the cited polyols, for instance on the aromatic polyols and epichlorohydrin. Further suitable polyols are polymers and copolymers which contain hydroxyl groups in the polymer chain or in side groups, for example polyvinyl alcohol and copolymers thereof or hydroxyalkyl polymethacrylates or copolymers thereof. Other suitable polyols are oligoesters carrying hydroxyl end groups.

Illustrative examples of aliphatic and cycloaliphatic polyols are alkylenediols containing for example 2 to 12 carbon atoms, including ethylene glycol, 1,2- or 1,3-propanediol, 1,2-, 1,3- or 1,4-butanediol, pentanediol, hexanediol, octanediol, dodecanediol, diethylene glycol, triethylene glycol, polyethylene glycols having molecular weights of for instance 200 to 1500, 1,3-cyclopentanediol, 1,2-, 1,3-or 1,4-cyclohexanediol, 1,4-dihydroxymethylcyclohexane, glycerol, tris(β-hydroxyethyl)amine, trimethylolethane, trimethylolpropane, pentaerythritol, dipentaerythritol and sorbitol.

The polyols may be esterified partially or completely with one or with different unsaturated carboxylic acids, in which case the free hydroxyl groups of the partial esters may be modified, for example etherified, or esterified with other carboxylic acids.

Illustrative examples of esters are: Trimethylolpropane triacrylate, trimethylolethane triacrylate, trimethylolpropane trimethacrylate, trimethylolethane trimethacrylate, tetramethylene glycol dimethacrylate, triethylene glycol dimethacrylate, tetraethylene glycol diacrylate, pentaerythritol diacrylate, pentaerythritol triacrylate, pentaerythritol tetraacrylate, dipentaerythritol diacrylate, dipentaerythritol triacrylate, dipentaerythritol tetraacrylate, dipentaerythritol pentacrylate, dipentaerythritol hexacrylate, tripentaerythritol octacrylate, pentaerythritol dimethacrylate, pentaerythritol trimethacrylate, dipentaerythritol dimethacrylate, dipentaerythritol tetramethacrylate, tripentaerythritol octamethacrylate, pentaerythritol diitaconate, dipentaerythritol trisitaconate, dipentaerythritol pentaitaconate, dipentaerythritol hexaitaconate, ethylene glycol diacrylate, 1,3-butanediol diacrylate, 1,3-butanediol dimethacrylate, 1,4-butanediol diitaconate, sorbitol triacrylate, sorbitol tetraacrylate, pentaerythritol-modified triacrylate, sorbitol tetramethacrylate, sorbitol pentacrylate, sorbitol hexacrylate, oligoester acrylates and methacrylates, glycerol di- and-triacrylate, 1,4-cyclohexanediacrylate, bisacrylates and bismethacrylates of polyethylene glycol having molecular weights of 200 to 1500, or mixtures thereof. Polyfunctional monomers and oligomers are available for example from UCB Chemicals, Smyrna, Ga., and Sartomer, Exton, Pa.

Suitable ethylenically unsaturated polymerizable compounds are also the amides of identical or different unsaturated carboxylic acids of aromatic, cycloaliphatic and aliphatic polyamines containing for instance 2 to 6, for example 2 to 4, amino groups. Exemplary of such polyamines are ethylenediamine, 1,2- or 1,3-propylenediamine, 1,2-, 1,3-or 1,4- butylenediamine, 1,5-pentylenediamine, 1,6-hexylenediamine, octylenediamine, dodecylenediamine, 1,4-diaminocyclohexane, isophoronediamine, phenylenediamine, bisphenylenediamine, bis(β-aminoethyl) ether, diethylenetriamine, triethylenetetramine, bis(□-aminoethoxy)ethane or bis(β-aminopropoxy)ethane. Other suitable polyamines are polymers and copolymers which may contain additional amino groups in the side-chain and oligoamides containing amino end groups.

Exemplary of such unsaturated amides are: Methylenebisacrylamide, 1,6-hexamethylenebisacrylamide, diethylenetriaminetrismethacrylamide, bis(methacrylamidopropoxy) ethane, β-methacrylamidoethylmethacrylate, N-[(β-hydroxyethoxy)ethyl]acrylamide.

Suitable unsaturated polyesters and polyamides are derived typically from maleic acid and diols or diamines. Maleic acid can be partially replaced by other dicarboxylic acids such as fumaric acid, itaconic acid, citraconic acid, mesaconic acid or chloromaleic acid. To control the reactivity of the polyester and to influence the crosslinking density and hence the product properties, it is possible to use in addition to the unsaturated dicarboxylic acids different amounts of saturated dicarboxylic acids such as phthalic acid, isophthalic acid, terephthalic acid, tetrahydrophthalic acid, succinic acid or adipic acid. The unsaturated polyesters can be used together with ethylenically unsaturated comonomers such as styrene. The polyesters and polyamides can also be derived from dicarboxylic acids and ethylenically unsaturated diols or diamines, especially from those with long chains containing typically from 6 to 20 carbon atoms. Polyurethanes are typically those derived from saturated or unsaturated diisocyanates and unsaturated and saturated diols.

Suitable polyester acrylates or acrylated polyesters are obtained by reacting oligomers, typically epoxides, urethanes, polyethers or polyesters, with acrylates such as hydroxyethyl acrylate or hydroxypropyl acrylate.

Polybutadiene and polyisoprene and copolymers thereof are known. Suitable comonomers include olefins such as ethylene, propene, butene, hexene, (meth)acrylates, acrylonitrile, styrene or vinyl chloride. Polymers containing (meth)acrylate groups in the side-chain are also known. They may typically be reaction products of epoxy resins based on novolak with (meth)acrylic acid, homo- or copolymers of polyvinyl alcohol or their hydroxyalkyl derivatives which are esterified with (meth)acrylic acid or homo- and copolymers of (meth)acrylates which are esterified with hydroxyalkyl(meth)acrylates.

Monomers are for instance alkyl- or hydroxyalkyl acrylates or methacrylates, styrene, ethylene glycol diacrylate, propylene glycol diacrylate, neopentyl glycol diacrylate, hexamethylene glycol diacrylate or bisphenol A diacrylate, 4,4'-bis(2-acryloyloxyethoxy)diphenylpropane, trimethylolpropane triacrylate, pentaerythritol triacrylate or tetraacrylate, for instance acrylates, styrene, hexamethylene glycol or bisphenol A diacrylate, 4,4'-bis(2-acryloyloxyethoxy)diphenylpropane or trimethylolpropane triacrylate.

Oligomeric polyunsaturated compounds are for instance polyester acrylates or unsaturated polyester resins which are prepared from maleic acid, fumaric acid, phthalic acid and one or more than one diol, and which typically have molecular weights from about 500 to 3000.

Unsaturated carboxylic acids are for example acrylic acid and methacrylic acid.

The photopolymerizable compounds are used by themselves or in any desired mixtures. It is suitable to use mixtures of polyol(meth)acrylates.

Binders may also be added to the unsaturated photopolymerizable compounds. The addition of binders is particularly useful if the photopolymerizable compounds are liquid or viscous substances. The amount of binder may be from 5–95, for example 10–90, for instance 40–90, percent by weight, based on the entire composition. The choice of binder will depend on the field of use and the desired properties therefore, such as the ability of the compositions to be developed in aqueous and organic solvent systems, adhesion to substrates and susceptibility to oxygen.

Suitable binders are typically polymers having a molecular weight of about 5,000 to 2,000,000, for instance 10,000 to 1,000,000. Illustrative examples are: Homo- and copolymers of acrylates and methacrylates, including copolymers of methyl methacrylate/ethyl acrylate/methacrylic acid, poly (alkylmethacrylates), poly(alkylacrylates); cellulose esters and ethers such as cellulose acetate, cellulose acetobutyrate, methyl cellulose, ethyl cellulose; polyvinyl butyral, polyvinyl formal, cyclized rubber, polyethers such as polyethylene oxide, polypropylene oxide, polytetrahydrofuran; polystyrene, polycarbonate, polyurethane, chlorinated polyolefins, polyvinyl chloride, copolymers of vinyl chloride/vinylidene chloride, copolymers of vinylidene chloride with acrylonitrile, methyl methacrylate and vinyl acetate, polyvinyl acetate, copoly(ethylene/vinyl acetate), polymers such as polycaprolactam and poly(hexamethylene adipamide), polyesters such as poly(ethylene glycol terephthalate) and poly (hexamethylene glycol succinate).

The unsaturated compounds can also be used in admixture with non-photopolymerizable film-forming components. These components may be physically drying polymers or solutions thereof in organic solvents, for example nitrocellulose or cellulose acetobutyrate. The photopolymerizable unsaturated monomers may be a component of a free radical-ionic curable blend, such as a free radical-cationic curable blend. Also of importance are systems that undergo both thermal and photo-induced curing cycles, such as are used in powder coatings, laminates, certain adhesives and conformal coatings.

Mixtures of a prepolymer with polyunsaturated monomers which, additionally contain a further unsaturated monomer are frequently used in paint systems. The prepolymer in this instance primarily determines the properties of the paint film and, by varying it, the skilled person can influence the properties of the cured film. The polyunsaturated monomer acts as crosslinking agent that renders the paint film insoluble. The mono-unsaturated monomer acts as reactive diluent with the aid of which the viscosity is lowered without having to use a solvent. Moreover, properties of the cured composition such as curing rate, crosslinking density and surface properties are dependent on the choice of monomer.

Unsaturated polyester resins are usually used in two-component systems, together with a mono-unsaturated monomer, for example with styrene.

Binary electron-rich/electron-poor monomer systems are often employed in thick pigmented coatings. For example, vinyl ether/unsaturated polyester systems are employed in powder coatings and styrene/unsaturated polyester systems are used in gel coats.

A suitable process is that wherein the ethylenically unsaturated polymerizable compounds are a mixture of at least one oligomeric compound and at least one monomer.

An interesting process is that wherein the ethylenically unsaturated polymerizable compounds are a mixture of 1) unsaturated polyesters, especially those that are prepared from maleic acid, fumaric acid and/or phthalic acid and one or more than one diol, and which have molecular weights of 500 to 3,000, and 2) acrylates, methacrylates or styrene or combinations thereof.

An important process is also that wherein the ethylenically unsaturated polymerizable compounds are a mixture of 1) unsaturated polyesters and 2) acrylates or methacrylates or combinations thereof.

Another interesting process is that wherein the ethylenically unsaturated polymerizable compounds are a mixture of 1) unsaturated polyester acrylates and 2) acrylates or methacrylates or combinations thereof.

The present photopolymerizable coating compositions may additionally contain further additives. Examples thereof are thermal inhibitors, which are intended to prevent premature polymerization, for example hydroquinone, hydroquinone derivatives, p-methoxyphenol, β-naphthol or sterically hindered phenols such as 2,6-di(tert-butyl)-p-cresol. To enhance the dark storage stability it is possible to add copper compounds, including copper naphthenate, copper stearate or copper octoate, phosphorus compounds, including triphenylphosphine, tributylphosphine, triethyl phosphite, triphenyl phosphite, or tribenzyl phosphite, quaternary ammonium compounds, such as tetramethylammonium chloride or trimethylbenzylammonium chloride, or hydroxylamine derivatives, such as N-diethylhydroxylamine. The exclusion of atmospheric oxygen during the polymerization may be effected by adding paraffin or similar wax-like substances which, at the onset of polymerization, migrate to the surface owing to lack of solubility in the polymer and form a transparent film which prevents air from entering the system. Similarly, an oxygen-impermeable layer may be applied. UV absorbers, typically those of the hydroxyphenylbenzotriazole, hydroxyphenylbenzophenone, oxanilide or hydroxyphenyl-s-triazine type, or combinations thereof, may be added as light stabilizers. It may be advantageous to add light stabilizers that do not absorb UV light, for example those of the sterically hindered amine (HALS) class. The light stabilizers selected from the classes of UV absorbers or HALS may be employed separately or in any combination.

Examples of such standard UV absorbers and light stabilizers are:

1. 2-(2-Hydroxyphenyl)benzotriazoles, for example 2-(2-hydroxy-5-methylphenyl)-benzotriazole, 2-(3,5-di-tert-butyl-2-hydroxyphenyl)benzotriazole, 2-(5-tert-butyl-2-hydroxyphenyl)benzotriazole, 2-(2-hydroxy-5-(1,1,3,3,-tetramethylbutyl)phenyl)benzotriazole, 2-(3,5-di-tert-butyl-2-hydroxyphenyl)-5-chloro-benzotriazole, 2-(3-tert-butyl-2-hydroxy-5-methylphenyl)-5-chloro-benzotriazole, 2-(3-sec-butyl-5-tert-butyl-2-hydroxyphenyl)benzotriazole, 2-(2-hydroxy-4-octyloxyphenyl)benzotriazole, 2-(3,5-di-tert-amyl-2-hydroxyphenyl)benzotriazole, 2-(3,5-bis-(α, α-dimethylbenzyl)-2-hydroxyphenyl)benzotriazole, 2-(3-tert-butyl-2-hydroxy-5-(2-octyloxycarbonylethyl)phenyl)-5-chloro-benzotriazole, 2-(3-tert-butyl-5-[2-(2-ethylhexyloxy)-carbonylethyl]-2-hydroxyphenyl)-5-chloro-benzotriazole, 2-(3-tert-butyl-2-hydroxy-5-(2-methoxycarbonylethyl)phenyl)-5-chloro-benzotriazole, 2-(3-tert-butyl-2-hydroxy-5-(2-methoxy-carbonylethyl)phenyl)benzotriazole, 2-(3-tert-butyl-2-hydroxy-5-(2-octyloxy-carbonylethyl)-phenyl)benzotriazole, 2-(3-tert-butyl-5-[2-(2-ethylhexyloxy)carbonylethyl]-2-hydroxyphenyl) benzotriazole, 2-(3-dodecyl-2-hydroxy-5-methylphenyl) benzotriazole, 2-(3-tert-butyl-2-hydroxy-5-(2-isooctyloxycarbonylethyl)phenylbenzotriazole, 2,2'-methylene-bis[4-(1,1,3,3-tetramethylbutyl)-6-benzotriazole-2-ylphenol]; the transesterification product of 2-[3-tert-butyl-5-(2-methoxycarbonylethyl)-2-hydroxyphenyl]-2H-benzotriazole with polyethylene glycol 300; [R—CH₂CH₂—COO—CH₂CH₂—548—]₂ where R=3'-tert-butyl-4'-hydroxy-5'-2H-benzotriazol-2-yl phenyl, 2-[2-hydroxy-3-(α,α-dimethylbenzyl)-5-(1,1,3,3-tetramethylbutyl)-phenyl]benzotriazole; 2-[2-hydroxy-3-(1,1,3,3-tetramethylbutyl)-5-(α,α-dimethylbenzyl)-phenyl]benzotriazole.

2,2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

3. Esters of substituted and unsubstituted benzoic acids, as for example 4-tertbutyl-phenyl salicylate, phenyl salicylate, octylphenyl salicylate, dibenzoyl resorcinol, bis(4-tert-butylbenzoyl) resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

4. Acrylates, for example ethyl α-cyano-β,β-diphenylacrylate, isooctyl α-cyano-β,β-diphenylacrylate, methyl α-carbomethoxycinnamate, methyl α-cyano-β-methyl-p-methoxy-cinnamate, butyl α-cyano-β-methyl-p-methoxycinnamate, methyl α-carbomethoxy-p-methoxycinnamate and N-(β-carbomethoxy-β-cyanovinyl)-2-methylindoline.

5. Sterically hindered amines, for example bis(2,2,6,6-tetramethyl-4-piperidyl) sebacate, bis(2,2,6,6-tetramethyl-4-piperidyl) succinate, bis(1,2,2,6,6-pentamethyl-4-piperidyl) sebacate, bis(1-octyloxy-2,2,6,6-tetramethyl-4-piperidyl) sebacate, bis(1,2,2,6,6-pentamethyl-4-piperidyl) n-butyl-3,5-di-tert-butyl-4-hydroxybenzylmalonate, the condensate of 1-(2-hydroxyethyl)-2,2,6,6-tetramethyl-4-hydroxypiperidine and succinic acid, linear or cyclic condensates of N,N'-bis(2,2,6,6-tetramethyl-4-piperidyl)hexamethylenediamine and 4-tert-octylamino-2,6-dichloro-1,3,5-triazine, tris (2,2,6,6-tetramethyl-4-piperidyl) nitrilotriacetate, tetrakis(2,2,6,6-tetramethyl-4-piperidyl)-1,2,3,4-butane-tetracarboxylate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl) malonate, 3-n-octyl-7,7,9,9-tetramethyl-1,3,8-triazaspiro[4.5]decan-2,4-dione, bis(1-octyloxy-2,2,6,6-tetramethylpiperidyl) sebacate, bis(1-octyloxy-2,2,6,6-tetramethylpiperidyl) succinate, linear or cyclic condensates of N,N'-bis-(2,2,6,6-tetramethyl-4-piperidyl)-hexamethylenediamine and 4-morpholino-2,6-dichloro-1,3,5-triazine, the condensate of 2-chloro-4,6-bis(4-n-butylamino-2,2,6,6-tetramethylpiperidyl )-1,3,5-triazine and 1,2-bis(3-amino-propylamino) ethane, the condensate of 2-chloro-4,6-di-(4-n-butylamino-1,2,2,6,6-pentamethylpiperidyl)-1,3,5-triazine and 1,2-bis-(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidin-2,5-dione, 3-dodecyl-1-(1,2,2,6,6-pentamethyl-4-piperidyl) pyrrolidine-2,5-dione, a mixture of 4-hexadecyloxy- and 4-stearyloxy-2,2,6,6-tetramethylpiperidine, a condensation product of N,N'-bis(2,2,6,6-tetramethyl-4-piperidyl)hexamethylenediamine and 4-cyclohexylamino-2,6-dichloro-1,3,5-triazine, a condensation product of 1,2-bis(3-aminopropylamino)ethane and 2,4,6-trichloro-1,3,5-triazine as well as 4-butylamino-2,2,6,6-tetramethylpiperidine (CAS Reg. No. [136504-96-6]); N-(2,2,6,6-tetramethyl-4-piperidyl)-n-dodecylsuccinimid, N-(1,2,2,6,6-pentamethyl-4-piperidyl)-n-dodecylsuccinimid, 2-undecyl-7,7,9,9-tetramethyl-1-oxa-3,8-diaza-4-oxo-spiro[4,5]decane, a reaction product of 7,7,9,9-tetramethyl-2-cycloundecyl-1-oxa-3,8-diaza-4-oxospiro [4,5]decane and epichlorohydrin, 1,1-bis(1,2,2,6,6-pentamethyl-4-piperidyloxycarbonyl)-2-(4-methoxyphenyl)ethene, N,N'-bis-formyl-N,N'-bis(2,2,6,6-tetramethyl-4-piperidyl) hexamethylenediamine, diester of 4-methoxy-methylenemalonic acid with 1,2,2,6,6-pentamethyl-4-hydroxypiperidine, poly[methylpropyl-3-oxy-4-(2,2,6,6-tetramethyl-4-piperidyl)]siloxane, reaction product of maleic acid anhydride-α-olefin-copolymer with 2,2,6,6-tetramethyl-4-aminopiperidine or 1,2,2,6,6-pentamethyl-4-aminopiperidine.

6. Sterically hindered amines substituted on the N-atom by a hydroxy-substituted alkoxy group, for example compounds such as 1-(2-hydroxy-2-methylpropoxy)-4-octadecanoyloxy-2,2,6,6-tetramethylpiperidine, 1-(2-hydroxy-2-methylpropoxy)-4-hexadecanoyloxy-2,2,6,6-tetramethylpiperidine, the reaction product of 1-oxyl-4-hydroxy-2,2,6,6-tetramethylpiperidine with a carbon radical from t-amylalcohol, 1-(2-hydroxy-2-methylpropoxy)-4-hydroxy-2,2,6,6-tetra-methylpiperidine, 1-(2-hydroxy-2-methylpropoxy)-4-oxo-2,2,6,6-tetramethylpiperidine, bis(1-(2-hydroxy-2-methylpropoxy)-2,2,6,6-tetramethylpiperidin-4-yl) sebacate, bis(1-(2-hydroxy-2-methylpropoxy)-2,2,6,6-tetramethylpiperidin-4-yl) adipate, bis(1-(2-hydroxy-2-methylpropoxy)-2,2,6,6-tetramethylpiperidin-4-yl) succinate, bis (1-(2-hydroxy-2-methylpropoxy)-2,2,6,6-tetra-methylpiperidin-4-yl) glutarate and 2,4-bis{N-[1-(2-hydroxy-2-methylpropoxy)-2,2,6,6-tetra-methylpiperidin-4-yl]-N-butylamino}-6-(2-hydroxyethylamino)-s-triazine.

7. Oxamides, for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides.

8. 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis (2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropoxy)phenyl]-4,6-bis(2,4-dimethylphenyl)-1,3,5-triazine, 2-[2-hydroxy-4-(2-hydroxy-3-octyloxy-propyloxy)phenyl]-4,6-bis(2,4-dimethylphenyl)-1,3,5-triazine, 2-[4-(dodecyloxy/tridecyloxy-2-hydroxypropoxy)-2-hydroxy-phenyl]-4,6-bis(2,4-dimethylphenyl)-1,3,5-triazine, 2-[2-hydroxy-4-(2-hydroxy-3-dodecyloxy-propoxy)phenyl]-4,6-bis(2,4-dimethylphenyl)-1,3,5-triazine, 2-(2-hydroxy-4-hexyloxy) phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxypropoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4-dimethylphenyl)-1,3,5-triazine, 4,6-bis(2,4-dimethylphenyl)-2-[2-hydroxy-4-(2-hydroxy-3-nonyloxypropoxy)-5-(1-methyl-1-phenylethyl)phenyl]-1,3,5-triazine.

9. Phosphites and phosphonites, for example triphenyl phosphite, diphenyl alkyl phosphites, phenyl dialkyl phosphites, tris(nonylphenyl) phosphite, trilauryl phosphite, trioctadecyl phosphite, distearyl pentaerythritol diphosphite, tris(2,4-di-tert-butylphenyl) phosphite, diisodecyl pentaerythritol diphosphite, bis(2,4-di-tert-butylphenyl) pentaerythritol diphosphite, bis(2,6-di-tert-butyl-4-methylphenyl)-pentaerythritol diphosphite, diisodecyloxypentaerythritol diphosphite, bis(2,4-di-tert-butyl-6-methylphenyl)pentaerythritol diphosphite, bis(2,4,6-tris(tert-butylphenyl)pentaerythritol diphosphite, tristearyl sorbitol triphosphite, tetrakis(2,4-di-tert-butylphenyl) 4,4'-biphenylene diphosphonite, 6-isooctyloxy-2,4,8,10-tetra-tert-butyl-dibenzo[d,f][1,3,2]dioxaphosphepin, 6-fluoro-2,4,8,10-tetra-tert-butyl-12-methyl-dibenzo[d,g][1,3,2] dioxaphosphocin, bis(2,4-di-tert-butyl-6-methylphenyl) methyl phosphite, bis(2,4-di-tert-butyl-6-methylphenyl) ethyl phosphite, 2,2',2"-nitrilo[triethyltris(3,3',5,5'-tetra-tert-butyl-1,1'-biphenyl-2,2'-diyl)phosphite], 2-ethylhexyl(3,3',5,5'-tetra-tert-butyl-1,1'-biphenyl-2,2'-diyl)phosphite.

It may be advantageous to employ hindered amine stabilizers which contain ethylenically unsaturated moieties in the present process. For example the hindered amine 1-octyloxy-2,2,6,6-tetramethyl-piperidin-4-yl methacrylate, the acrylate analogue thereof, and the hindered N—H, or N-methyl version of both the methacrylate and the acrylate.

Additionally, there may be employed in the processes and compositions of this invention additives selected from the classes of fillers, flow aids, adhesion promoters, rheological modifiers such as fumed silica, pigments, dyes, optical brighteners, wetting agents and surfactants, among others.

Advantageously, a mixture of more than one of present hydroxyphenylbenzotriazoles may be employed. Another specific embodiment is where additional additives selected from the group consisting of hydroxyphenyltriazine UV absorbers and hindered amine light stabilizers are employed. Hindered amine light stabilizers is a generic term that encompasses sterically hindered amine additives with any substitution on the N atom, for example alkoxy and hydroxy-substituted alkoxy groups.

The thickness of the coating films (dry film thickness) of the present invention are for example from about 0.2 mil to about 5 mil. For instance, the present dry (cured) film thicknesses are from about 0.2 mil to about 4 mil, from about 0.2 mil to about 3 mil, from about 0.2 mil to about 2 mil, or from about 0.2 mil to about 1 mil. For example, the present dry film thicknesses are from about 0.5 mil to about 5 mil, from about 1 mil to about 5 mil, from about 2 mil to about 5 mil, from about 3 mil to about 5 mil, or from about 4 mil to about 5 mil. For example, the present dry coating film thicknesses are from about 0.5 mil to about 3.5 mil, or from about 1 mil to about 2.5 mil.

The films prepared according to this invention are advantageously employed for example as window films, in graphic overcoating, as solar control films, as backlit display films, as overlaminate films (exterior or interior digital graphics and the like), in signage, in laminated glazing, ink jet media coatings, in electrochromic/photochromic applications, optical light films, in safety glass/windshield interlayers, in-mold films, decals, anti-grafitti films, specialty packaging, compact disc coatings, protective coatings for polymer substrates (e.g. for plastic parts such as machine and automobile parts), and other high-performance thin coating applications.

The present films are especially effective towards preventing the underlying substrate against the deleterious effects of UV radiation. For example, they are especially effective towards the protection of dyes or pigments present in underlying substrates against color fade.

The substrate surface can be coated by applying to said substrate a liquid composition, a solution or suspension. The choice of solvent and the concentration will depend mainly on the type of formulation and on the coating method employed. The solvent should be inert; in other words it should not undergo any chemical reaction with the components and should be capable of being removed again after the coating operation, in the drying process. Examples of suitable solvents are ketones, ethers and esters, such as methyl ethyl ketone, isobutyl methyl ketone, cyclopentanone, cyclohexanone, N-methylpyrrolidone, dioxane, tetrahydrofuran, 2-methoxyethanol, 2-ethoxyethanol, 1-methoxy-2-propanol, 1,2-dimethoxyethane, ethyl acetate, n-butyl acetate and ethyl 3-ethoxypropionate. The suspension is uniformly applied to a substrate by known coating techniques such as by spin coating, dip coating, curtain coating, knife coating, brushing or spraying or reverse roll coating. It is also possible to apply the photosensitive layer to a temporary, flexible support and then to coat the final substrate, for example a copper-laminated circuit board, by means of layer transfer via lamination.

The present method may additionally be employed for radiation-curable powder coatings. The powder coatings can be based on solid resins and on monomers containing reactive double bonds, for example maleates, vinyl ethers, acrylates, acrylamides and mixtures thereof. A free-radically UV-curable powder coating can be formulated by mixing unsaturated polyester resins with solid acrylamides (e.g. methyl methacrylamidoglycolate) and with a free-radical photoinitiator system according to the invention, as described, for example, in the paper "Radiation Curing of Powder Coating", Conference Proceedings, Radtech Europe 1993 by M. Wittig and Th. Gohmann. Similarly, free-radically UV-curable powder coatings can be formulated by mixing unsaturated polyester resins with solid acrylates, methacrylates or vinyl ethers and with a photoinitiator system according to the invention. The powder coatings may also comprise binders as described, for example, in DE-A-4228514 and EP-A-636669. The UV-curable powder coatings may also comprise white or colored pigments. Thus, for example, rutile titanium dioxide can be employed in concentrations of up to 50% by weight in order to give a cured powder coating having good covering power. The process normally comprises electrostatic or tribostatic spraying of the powder onto the substrate, for example metal or wood, melting of the powder by heating and, after a smooth film has been formed, radiation-curing of the coating using ultraviolet and/or visible light, for example with medium-pressure mercury lamps, metal halide lamps or xenon lamps. A particular advantage of the radiation-curable powder coatings over their heat-curable counterparts is that the flow time after the melting of the powder particles can be selectively extended in order to ensure the formation of a smooth, high-gloss coating. In contrast to heat-curable systems, radiation-curable powder coatings can be formulated without the unwanted effect of a reduction in their lifetime, so that they melt at relatively low temperatures. For this reason, they are also suitable as coatings for heat-sensitive substrates such as wood or plastics. In addition to the photoinitiator systems according to the invention, the powder coating formulations may also include UV absorbers. Appropriate examples have been listed above under sections 1.–8.

The photosensitivity of the compositions according to the invention generally ranges from the UV region (about 200 nm) up to about 600 nm. Suitable radiation comprises, for example, sunlight or light from artificial sources. Therefore, a large number of very different types of light source can be used. Both point sources and flat radiators (lamp carpets) are appropriate. Examples are carbon arc lamps, xenon arc lamps, medium-pressure, high-pressure and low-pressure mercury lamps, doped with metal halides if desired (metal halogen lamps), microwave-stimulated metal vapor lamps, excimer lamps, superactinic fluorescent tubes, fluorescent lamps, incandescent argon lamps, electronic flashlights, photographic flood lamps, electron beams and X-rays. For example, Hg lamps, iron doped Hg lamps or Ga doped Hg lamps are suitable. Artificial light sources equivalent to daylight may be used, such as low intensity lamps such as specific fluorescent lamps, e.g. Philips TL05 or TL09 special fluorescent lamps. The distance between the lamp and the substrate according to the invention which is to be coated can vary depending on the application and on the type and/or power of the lamp, for example between 2 cm and 150 cm. Also suitable, for example, are lasers in the visible range. The cure may be effected behind a transparent layer (e.g. a pane of glass or plastic sheet).

Complicated and expensive apparatus is superfluous when using light sources that emit light of low intensity, and the compositions in this case can be used in particular for special exterior applications. The cure with daylight or with light sources equivalent to daylight is an alternative to the standard moving belt method of UV curing. In contrast to the moving belt method, which is particularly suitable for flat parts, the daylight cure can be used for exterior coatings on stationary and fixed objects or constructions. These are typically coatings on buildings, facades, bridges, ships or markings on roads and sites as disclosed, inter alia, in EP-A-160723.

The cure with daylight or with light sources equivalent to daylight is an energy-saving method and, in exterior applications, no emission of volatile organic components into the environment occurs. The cure with daylight or light sources equivalent to daylight is, however, also suitable for series curing in which the objects are so positioned that angular areas are also exposed to daylight. In this connection, mirrors or reflectors can also be used.

The curable compositions are also a subject of this invention. Accordingly, further disclosed is a photo-curable coating composition, wherein said coating composition comprises a) at least one ethylenically unsaturated polymerizable compound, b) at least one durable and/or red-shifted reactable hydroxyphenylbenzotriazole UV absorber comprising an ethylenically unsaturated polymerizable group and c) a combination of photoinitiators comprising i) at least one α-hydroxy ketone photoinitiator and ii) at least one bisacylphosphine oxide photoinitiator.

The following Examples are for illustrative purposes and do not limit the present invention in any manner whatsoever.

The compounds

C 2-methyl-acrylic acid 3-[5-tert-butyl-4-hydroxy-3-(5-trifluoromethyl-benzotriazol-2-y)-phenyl]-propyl ester and D 2-methyl-acrylic acid 3-[3-(5-benzenesulfonyl-benzotriazol-2-yl)-5-tert-butyl-4-hydroxy-phenyl]-propyl ester are prepared as follows:

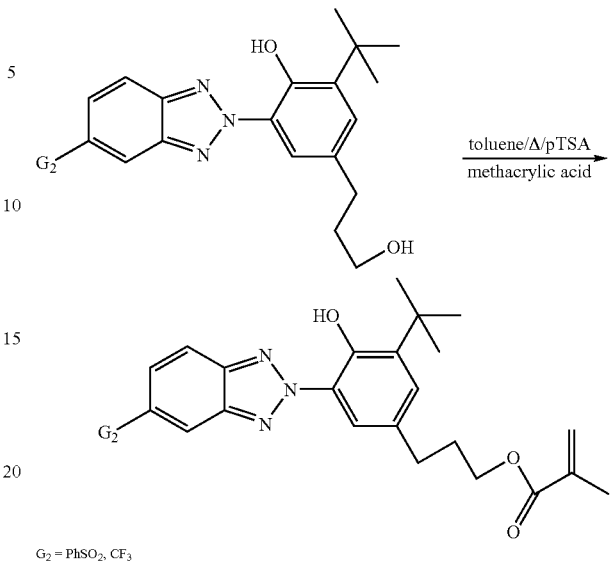

$G_2 = PhSO_2, CF_3$

Similarly, compounds of the formula

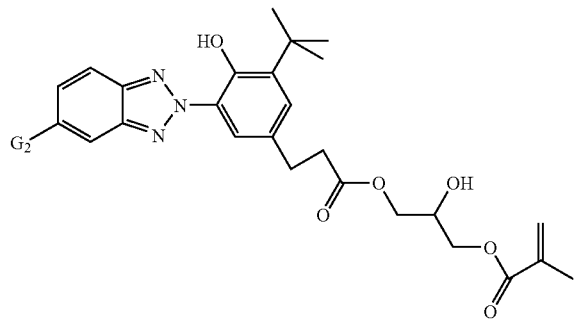

are prepared using glycidyl methacrylate and the appropriate benzotriazole hydrocinnamic acid compound.

Where present $E_3$ is alkenyl, the compounds are prepared for example via a Claisen rearrangement.

For example, the compound 5-trifluoromethyl-2-(2-hydroxy-3-allyl-5-tert-octyl-phenyl)-2H-benzotriazole is prepared as follows: trifluoromethyl-2-(2-hydroxy-5-tert-octylphenyl)-2H-benzotriazole (13.01 g, 0.033 mol), potassium hydroxide (2.37 g, 0.036 mol) and ethanol (60 mL) are charged to a reactor and stirred at ambient temperature for two hours. Allyl bromide (4.84 g, 0.039 mol) and potassium iodide (0.34 g, 0.002 mol) are added to the reaction mixture which is heated to 85° C. After holding at 85° C. for 4.5 hours, the solvent is removed and replaced with 100 mL of heptane. The mixture is washed thrice with 40 mL of water. The solvent is then removed to yield 14.2 g of the corresponding O-allyl ether as an off-white solid.

Analysis:

$^1$Hnmr (CDCl$_3$): δ 0.78 (s, 9H), 1.41 (s, 6H), 1.77 (s, 2H), 4.60–4.65 (d, 2H), 5.16–5.34 (m. 2H), 5.86–6.00 (m, 1H), 7.06–7.11 (d, 1H), 7.49–7.54 (dd, 1H), 7.61–7.67 (m, 2H), 8.08–8.12 (d, 1H), 8.35 (s, 1H)

The O-allyl compound (14.2 g) as prepared above is charged to a reactor and heated to 190–195° C. and held at that temperature for five hours. Flash column chromatography with silica gel and ethyl acetate/heptane solvent as eluent to give the title compound in 12.2 g yield as a yellow oil.

Analysis: Mass spectrometry: 432 (M+H); $^1$Hnmr (CDCl$_3$): δ 0.78 (s, 9H), 1.46 (s, 6H), 1.81 (s, 2H), 3.53–3.64 (d, 2H), 5.06–5.20 (m, 2H), 6.02–6.18 (m, 1H), 7.29–7.34 (d, 1H), 7.66–7.72 (dd, 1H), 8.05–8.12 (d, 1H), 8.29–8.35 (m, 2H), 11.17 (s, 1H)

This synthesis is as described for example in U.S. application Ser. No. 09/919,974, filed Aug. 1, 2001, the relevant disclosure of which is hereby incorporated by reference.

EXAMPLE 1

UV Absorption Spectra in Solution

The instant benzotriazoles have different electron withdrawing substituents in the 5-position of the benzo ring of the benzotriazole and with different substitutions on the phenyl ring at the 3- and 5-positions. The UV absorption spectra are measured in ethyl acetate at approximately 20 mg/L concentration. The instant compounds are clearly red-shifted as compared to a compound having only hydrogen at the 5-position of the benzo ring.

| Compound | λmax (nm) | Absorbance at 375 nm |
|---|---|---|
| A | 343 | 0.22 |
| B | 341 | 0.20 |
| C | 350 | 0.50 |
| D | 358 | 0.62 |

A is octyl 3-(2H-benzotrizol-2-yl)-5-tert-butyl-4-hydroxy-hydrocinnamate

B is 2-methyl-acrylic acid 3-[3-(3-benzotriazol-2-yl-5-tert-butyl-4-hydroxy-phenyl)-propionyloxy]-2-hydroxy-propyl ester C is 2-methyl-acrylic acid 3-[5-tert-butyl-4-hydroxy-3-(5-trifluoromethyl-benzotriazol-2-yl)-phenyl]-propyl ester D is 2-methyl-acrylic acid 3-[3-(5-benzenesulfonyl-benzotriazol-2-yl)-5-tert-butyl-4-hydroxy-phenyl]-propyl ester

EXAMPLE 2

UV Curable Formulation

Urethane acrylate oligomer (20 g, Bomar, BR 5824), ethoxylated bisphenol A diacrylate (20 g, Sartomer, SR 601), propoxylated trimethylol propane triacrylate (32 g, Sartomer, SR492), di-trimethylolpropane tetraacrylate (25 g, Sartomer, SR 355), bis (2,4,6-trimethylbenzoyl)-phenylphosphine oxide (0.33 g, Ciba, Irgacure® 819), 1-hydroxycyclohexylphenyl ketone (2.67 g, Ciba, Irgacure® 184), and, optionally, a reactable benzotriazole (3 g, 3% based on formulation weight) are added to a laboratory reactor equipped with the necessary auxiliary equipment. The mixture is agitated and heated gently to 50–80° C. for one hour after which the mass is cooled to ambient temperature and agitated for an additional hour.

UV Cured Film Preparation 2 mil (50 micron) thick films are prepared by applying the acrylate resin to glass plates using a Bird Film applicator, followed by UV light exposure under a nitrogen environment on a Fusion conveyer belt system (Fusion UV model DRS-10/12 conveyer system with nitrogen inerting capability). The lamp is a Fusion VPS/I600 (F600 series) irradiator that is equipped with a "D-lamp" (Fe doped mercury lamp bulb). A trace oxygen analyzer (Alpha Omega Instruments, model Series 2000) is used to measure O$_2$ levels during light curing. Under a nitrogen purge and at 50 ft/min conveyer belt speed, the oxygen levels are typically <200 ppm.

The VPS 600 unit is operated at variable voltage settings, which provided control over the light output intensity. The belt speed is maintained at a rate of 50 ft/min throughout all operations.

EXAMPLE 3

MEK Double Rub Test

The solvent resistance is determined using a MEK (methyl ethyl ketone) double rub test. This procedure is found in: Z. Jovanovic et al *Verfkroniek* 2001, 74(11), 29–32. The number of double rubs required to break or mar the surface of the coating is measured using a Crockmeter (Am. Assoc. of Textile Chemist Colorants, U.S. Pat. No. 2,114,831).

The MEK double rub is correlated to the solvent resistance and increases with the degree of cure. The degree of cure is related to the amount of light used to activate the photoinitiator. In general, the MEK double value is an increasing function of light dose and reaches a certain plateau value. A maximum of 100 MEK double rubs were interpreted as full cure for these coating, i.e., the solvent resistance was independent of the light dose when the MEK values of 100 or greater were obtained.

| Power (P) | Dose mJ/cm$^2$ | MEK Rub Test Results No UVA | MEK Rub Test Results 3% Compound C | MEK Rub Test Results 3% Compound D |
|---|---|---|---|---|
| 30% P | 16 | 75 | <10 | <10 |
| 40% P | 85 | 75 | >100 | 25 |
| 50% P | 192.3 | 75 | >100 | >100 |
| 60% P | 323 | >100 | >100 | — |
| 100% P | 829 | >100 | — | >100 |
| 2 passes at 100% P | 1658 | >100 | >100 | >100 |

UVA = Ultraviolet light absorber

C is 2-methyl-acrylic acid 3-[5-.tert.-butyl-4-hydroxy-3-(5-trifluoromethyl-benzotriazol-2-yl)-phenyl]-propyl ester D is 2-methyl-acrylic acid 3-[3-(5-benzenesulfonyl-benzotriazol-2-yl)-5-.tert.-butyl-4-hydroxy-phenyl]-propyl ester This demonstrates that the coating is readily cured in the presence of a red-shifted benzotriazole and it is not detrimental to the cure rate or cure speed.

EXAMPLE 4

Thumb-Twist Test

The thumb-twist test is used to assess the degree of cure and is a pass-fail test. The reference for this test is located in: C. Lowe, *Volume VI, Test methods for UV & EB Curable Systems*, p. 74 (Wiley/SITA Series in Surface Coatings Technology, SITA Technology Limited, 1996). It is carried out on a series of coatings that are exposed to increasingly higher amounts of UV dose. A failure is when the thumb-twist produces surface mar, which indicates the coating is undercured. The dose needed to pass the thumb-twist is when no surface mar occurs.

| Power (P) | Dose mJ/cm² | Coating with No UVA | Coating with 3% Compound C | Coating with 3% Compound D |
|---|---|---|---|---|
| 30% P | 16 | Fail | Fail | Fail |
| 40% P | 85 | Pass | Pass | Pass |
| 50% P | 192.3 | Pass | Pass | Pass |
| 60% P | 323 | Pass | Pass | Pass |
| 100% P | 829 | Pass | Pass | Pass |
| 2 passes at 100% P | 1658 | Pass | Pass | Pass |

UVA = Ultraviolet light absorber

C is 2-methyl-acrylic acid 3-[5-tert-butyl-4-hydroxy-3-(5-trifluoromethyl-benzotriazol-2-yl)-phenyl]-propyl ester D is 2-methyl-acrylic acid 3-[3-(5-benzenesulfonyl-benzotriazol-2-yl)-5-tert-butyl-4-hydroxy-phenyl]-propyl ester This further demonstrates that the coating is readily cured in the presence of a red-shifted benzotriazole and it is not detrimental to the cure rate or cure speed.

EXAMPLE 5

UV Stability and Photo-Bleaching Resistance

UV absorption spectra are taken of the cured films (containing 3 wt % UV absorber) to determine whether photobleaching of the UV absorber had occurs during UV curing. Little to no change in optical density is highly desired.

| | | | Optical Density (OD) | | |
|---|---|---|---|---|---|
| Power(P) | Dose mJ/cm² | Wavelength (nm) | Compound B | Compound C | Compound D |
| 40% P | 85 | 398 | 1.01 | 1.03 | 1.08 |
| 16 passes at 100% P | 13264 | 398 | 0.92 | 0.99 | 1.07 |

B (control) is 2-methyl-acrylic acid 3-[3-(3-benzotriazol-2-yl-5-tert-butyl-4-hydroxy-phenyl)-propionyloxy]-2-hydroxy-propyl ester C is 2-methyl-acrylic acid 3-[5-tert-butyl-4-hydroxy-3-(5-trifluoromethyl-benzotriazol-2-yl)-phenyl]-propyl ester D is 2-methyl-acrylic acid 3-[3-(5-benzenesulfonyl-benzotriazol-2-yl)-5-tert-butyl-4-hydroxy-phenyl]-propyl ester The absorption occurring from the control UV absorber (optical density) is decreased about 9% at high light doses. This demonstrates photo-fading of this compound occurred at very high light exposures (>13 J/cm²) and is less photostable than the instant red-shifted compounds.

The absorption occurring from the inventive UV absorbers C and D (optical density) changed very little and is invariant to the light dose. The fact that no change occurred in the UV absorption spectra of the UV absorbers in the cured coatings demonstrate that the instant compounds can survive the UV exposure conditions. Furthermore, it is found that no photo-fading of these compounds occurred even at very high light exposures (>13 J/cm²). This result demonstrates that the instant compounds could also be used in photo-curable coatings that require higher exposures than the one under current study.

EXAMPLE 6

Examples 2–5 are repeated, with the further inclusion of 1% weight percent of a hindered amine light stabilizer, for example Tinuvin® 123, bis(1-octyloxy-2,2,6,6-tetramethyl-4-piperidyl) sebacate, available from Ciba Specialty Chemicals. Excellent results are achieved.

EXAMPLE 7

Examples 2–6 are repeated, where an additional UV absorber is present. For example UV absorbers selected from 2-(1-methyl-1-phenyl-ethyl)-4-(1,1,3,3-tetramethyl-butyl)-6-(5-trifluoromethyl-benzotriazol-2-yl)-phenol, 2-(1-methyl-1-phenyl-ethyl)-4-(1,1,3,3-tetramethyl-butyl)-6-(benzotriazol-2-yl)-phenol, 2-(1-methyl-1-phenyl-ethyl)-4-(1,1,3,3-tetramethyl-butyl)-6-(5-trifluoromethyl-benzotriazol-2-yl)-phenol and 2-[4-(dodecyloxy/tridecyloxy-2-hydroxypropoxy)-2-hydroxyphenyl]-4,6-bis(2,4-dimethylphenyl)1,3,5-triazine.

Excellent results are achieved.

What is claimed is:

1. A process for forming a protective film coating which process comprises curing a coating composition by irradiating said composition with ultraviolet radiation or daylight or with light sources equivalent to daylight, wherein said coating composition comprises a) at least one ethylenically unsaturated polymerizable compound, b) at least one durable and/or red-shifted reactable hydroxyphenylbenzotriazole UV absorber comprising an ethylenically unsaturated polymerizable group and c) a combination of photoinitiators comprising
  i) at least one α-hydroxy ketone photoinitiator and
  ii) at least one bisacylphosphine oxide photoinitiator, wherein the hydroxyphenylbenzotriazoles of component b) are of the formula

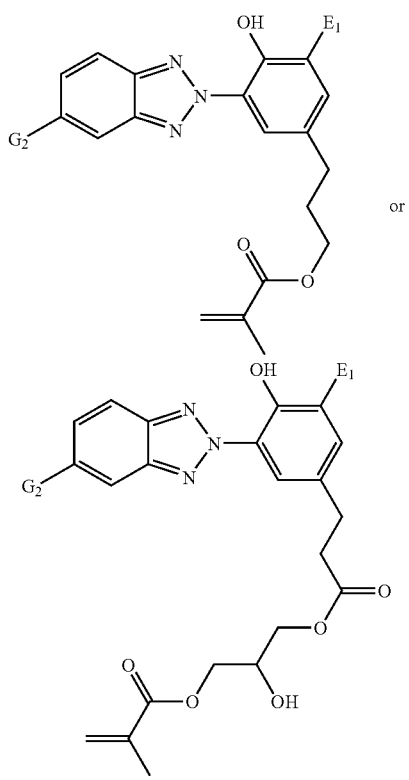

where
  $E_1$ is t-butyl or α-cumyl and
  $G_2$ is phenylsulfone or —$CF_3$;
wherein the alpha-hydroxy ketone photoinitiator of component c) i) is of formula

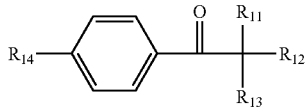

where
  $R_{11}$ and $R_{12}$ independently of one another are hydrogen, $C_1$–$C_6$ alkyl, phenyl, $C_1$–$C_6$ alkoxy, phenyl, $C_1$–$C_6$ alkoxy, $OSiR_{16}(R_{17})_2$ or —$O(CH_2CH_2O)_q$—$C_1$–$C_6$ alkyl, or
  $R_{11}$ and $R_{12}$, together with the carbon atom to which they are attached, form a cyclohexyl ring;
  q is a number from 1 to 20;
  $R_{13}$ is OH, $C_1$–$C_{16}$ alkoxy or —$O(CH_2CH_2O)_q$—$C_1$–$C_6$ alkyl;
  $R_{14}$ is hydrogen, $C_1$–$C_{18}$ alkyl, $C_1$–$C_{18}$ alkoxy, —$OCH_2CH_2$—$OR_{15}$, a group $CH_2$=$C(CH_3)$— or is

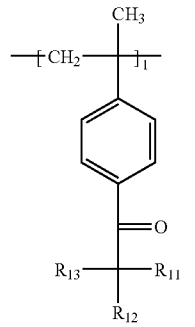

l is a number from 2 to 10;
  $R_{15}$ is hydrogen, —$COCH$=$CH_2$ or —$COC(CH_3)$=$CH_2$; and
  $R_{16}$ and $R_{17}$ independently of one another are $C_1$–$C_8$ alkyl or phenyl; and
wherein the bisacylphosphine oxide photoinitiator of component c) ii) is of formula

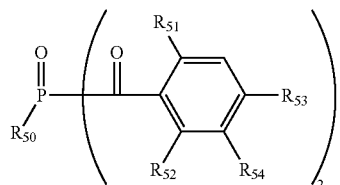

wherein $R_{50}$, is $C_1$–$C_{12}$ alkyl, cyclohexyl or phenyl which is unsubstituted or is substituted by 1 to 4 halogen or $C_1$–$C_8$ alkyl,
  $R_{51}$ and $R_{52}$ are each independently of the other $C_1$–$C_8$ alkyl or $C_1$–$C_8$ alkoxy,
  $R_{53}$ is hydrogen or $C_1$–$C_8$ alkyl, and
  $R_{54}$ is hydrogen or methyl.

2. A process according to claim 1 where the hydroxyphenylbenzotriazoles are

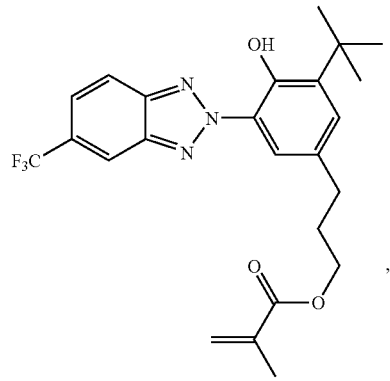

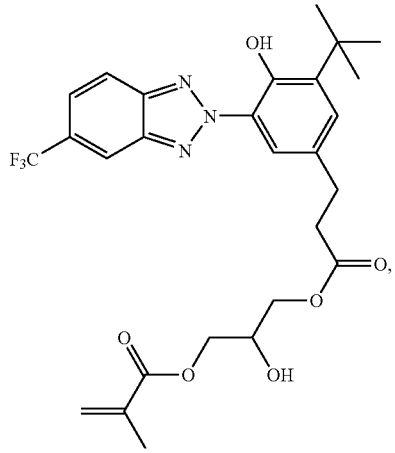

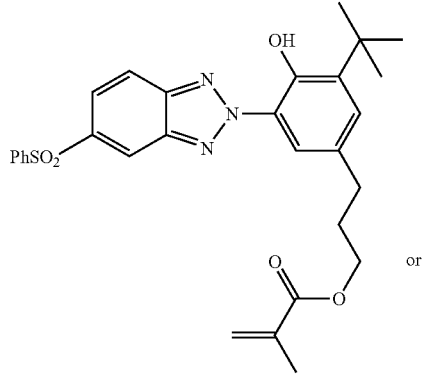

-continued

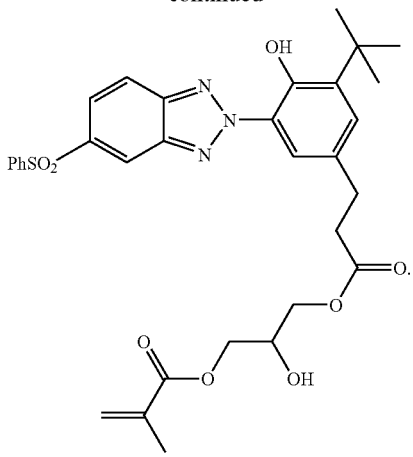

3. A process according to claim 1 where in the α-hydroxy ketone photoinitiators, $R_{11}$ and $R_{12}$ independently of one another are hydrogen, $C_1$–$C_6$ alkyl or phenyl or $R_{11}$ and $R_{12}$, together with the carbon atom to which they are attached, form a cyclohexyl ring; $R_{13}$ is OH; and $R_{14}$ is hydrogen, $C_1$–$C_{12}$ alkyl, $C_1$–$C_{12}$ alkoxy, —OCH$_2$CH$_2$OR$_{15}$, —C(CH$_3$)=CH$_2$ or is

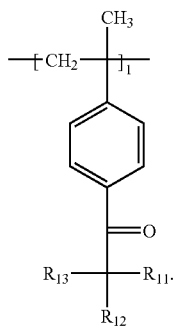

4. A process according to claim 1 where in the α-hydroxy ketone photoinitiators, $R_{11}$ and $R_{12}$ independently of one another are methyl or ethyl or $R_{11}$ and $R_{12}$, together with the carbon atom to which they are attached, form a cyclohexyl ring; $R_{13}$ is hydrogen and $R_{14}$ is hydrogen, $C_1$–$C_4$ alkyl, $C_1$–$C_4$ alkoxy, or —OCH$_2$CH$_2$OH.

5. A process according to claim 1 where the α-hydroxy ketone photoinitiators are selected from a group consisting of
α-hydroxycyclohexyl phenyl ketone,
2-hydroxy-2-methyl-1-phenylpropanone,
2-hydroxy-2-methyl-1-(4-isopropylphenyl)propanone,
2-hydroxy-2-methyl-1-(4-dodecylphenyl)propanone and
2-hydroxy-2-methyl-1-[(2-hydroxyethoxy)phenyl]propanone.

6. A process according to claim 1 where in the bisacylphosphine oxide photoinitiators, $R_{50}$ is $C_2$–$C_{10}$ alkyl, cyclohexyl or phenyl which is unsubstituted or is substituted by 1 to 4 $C_1$–$C_4$ alkyl, Cl or Br.

7. A process according to claim 1 where in the bisacylphosphine oxide photoinitiators, $R_{50}$ is $C_4$–$C_{12}$ alkyl or cyclohexyl, $R_5$, and $R_{52}$ are each independently of the other $C_1$–$C_8$ alkyl or $C_1$–$C_8$ alkoxy and $R_{53}$ is hydrogen or $C_1$–$C_8$ alkyl.

8. A process according to claim 1 where in the bisacylphosphine oxide photoinitiators, $R_{51}$ and $R_{52}$ are methyl or methoxy and $R_{53}$ is hydrogen or methyl and $R_{50}$ is isobutyl, phenyl or isooctyl.

9. A process according to claim 1 where the bisacylphosphine oxide photoinitiator is bis(2,4,6-trimethylbenzoyl)-phenylphosphine oxide or bis(2,6-dimethoxybenzoyl)-isooctylphosphine oxide.

10. A process according to claim 1 where the hydroxyphenylbenzotriazoles are present from about 0.5% to about 5% by weight, based on the weight of the coating composition.

11. A process according to claim 1 where the hydroxyphenylbenzotriazole are present from about 2% to about 4% by weight, based on the weight of the coating composition.

12. A process according to claim 1 where the α-hydroxy ketone photoinitiators are present from about 1% to about 7% by weight, based on the weight of the coating composition.

13. A process according to claim 1 where the α-hydroxy ketone photoinitiators are present from about 2% to about 6% by weight, based on the weight of the coating composition.

14. A process according to claim 1 where the α-hydroxy ketone photoinitiators are present from about 3% to about 5% by weight, based on the weight of the coating composition.

15. A process according to claim 1 where the bisacylphosphine oxide photoinitiators are present from about 0.1% to about 2% by weight, based on the weight of the coating composition.

16. A process according to claim 1 where the bisacylphosphine oxide photoinitators are present from about 0.2% to about 1.5%, based on the weight of the coating composition.

17. A process according to claim 1 where the bisacylphosphine oxide photoinitators are present from about 0.5 to about 1% by weight, based on the weight of the coating composition.

18. A process according to claim 1 where the weight ratio of α-hydroxy ketone component i) to bisacylphosphine oxide component ii) is from about 5:1 to about 15:1.

19. A process according to claim 1 where the weight ratio of α-hydroxy ketone component i) to bisacylphosphine oxide component ii) is from about 7:1 to about 12:1.

20. A process according to claim 1 where the weight ratio of α-hydroxy ketone component i) to bisacylphosphine oxide component ii) is from about 8:1 to about 11:1.

21. A process according to claim 1 where the thickness of the protective film coating is from about 0.2 mil to about 5 mil.

22. A process according to claim 1 where the thickness of the protective film coating is from about 0.5 mil to about 3.5 mil.

* * * * *